United States Patent [19]
Martin et al.

[11] 3,735,056
[45] May 22, 1973

[54] SYSTEM FOR TRANSMITTING DIGITAL SIGNALS

[75] Inventors: Helmut Martin; Lothar Krisch, both of Hannover, Germany

[73] Assignee: Kabel-und Metallwerke Gutehoffnungshutte Aktiengesellschaft, Hannover, Germany

[22] Filed: Mar. 6, 1972

[21] Appl. No.: 232,020

[30] Foreign Application Priority Data

Mar. 3, 1971 Germany..................P 21 10 090.3
June 6, 1971 Germany..................P 21 28 016.0

[52] U.S. Cl....179/170 E, 179/15 AD, 178/69.5 DC, 178/63 E
[51] Int. Cl.........................................H04l 25/02
[58] Field of Search.......................179/16 F, 170 C, 179/170 E, 170 HF, 15 AD; 178/69.5 DC, 63 A, 63 E; 325/6, 44, 324, 476; 333/29

[56] References Cited

UNITED STATES PATENTS 3,118,111 1/1964 Miller..............................179/15 AD

*Primary Examiner*—Ralph D. Blakeslee
*Attorney*—Ralf H. Siegemund

[57] ABSTRACT

In a communication system for the transmission of digital signals and including plural stranded conductors, respective two conductors defining a single transmission path, the system further including signal regenerating stations, for regenerating the individual signals for improving the signal to noise ratio of the transmission system as a whole, the digital signals as transmitted including clocking signals, transmitted in one of the paths; means are included in the system for equalizing propagation phase differences in the signals of the transmission paths of the plurality as resulting from differences in length of twist of the several conductors as stranded, to be in phase synchronism at a regenerating station.

5 Claims, 2 Drawing Figures

SYSTEM FOR TRANSMITTING DIGITAL SIGNALS

Figure 1:
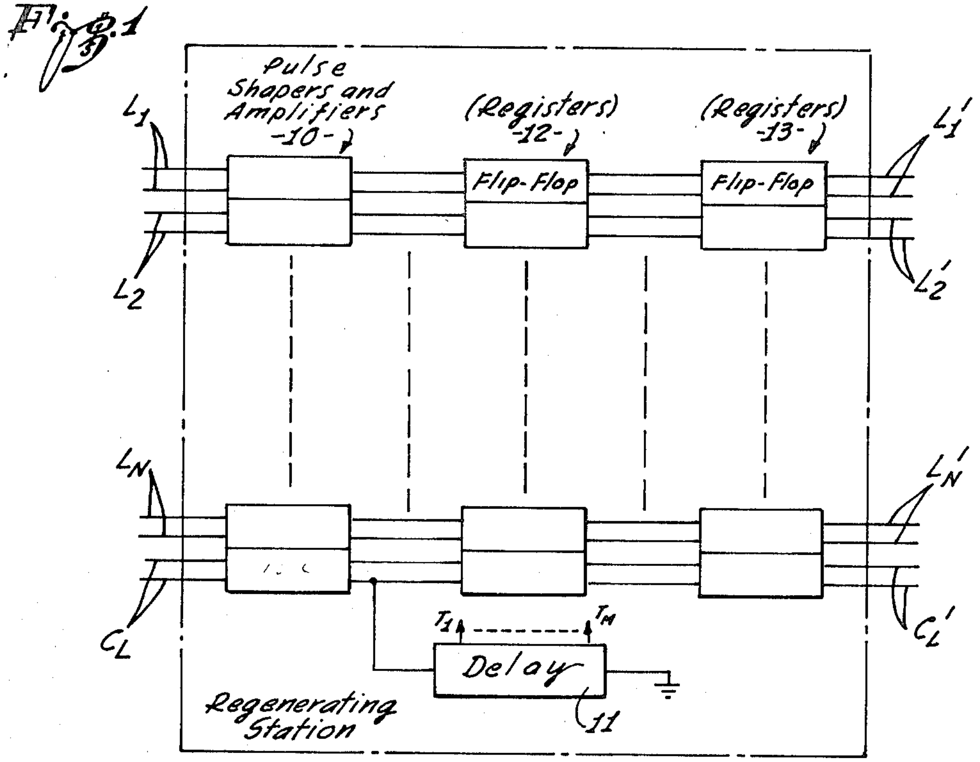

The present invention relates to a system for transmitting digital signals, particularly for signals in pulse code modulated format or pcm for short. Systems of this type are used in communications and include, for example, a cable constructed to include a large plurality of conductor pairs, either of the coaxial variety or in stranded configuration. Signal regnerators for receiving the several signals for amplifying and shaping them, and for transmitting, in turn, reconstituted signals, are usually installed in such a transmission system. Noise and crosstalk included in the signals as arriving in the regenerating station, can be more or less completely eliminated by such signal reconstruction.

Digital signals are increasingly used in communications; particularly, analog signals are frequently transmitted in digital format for improving the overall signal to noise ratio. Some of the telephone communication networks have already facilities for digitizing speech and using pcm signals for transmission; not too far in the future one can expect the construction of large, integrated communication networks, which are used for concurrent transmission of digitized telephone conversations as well as data.

Digital cables are already used in some local or area networks of the telephone communication system. Such network is to be used exclusively for the transmission of digital information, particularly in the pcm format, so that all analog signals to be transmitted have to be digitized. This is an important development because transmission of digitized information is considerably less amenable to distortion by crosstalk. Digital signals are more readily reconstructed, because they have definite format, also the bandwidth of information of digital significance can be made quite narrow, which permits recognition of bi-valued bits, even in case of severe signal distortions. As long as bit values can be distinguished and recognized, noise and crosstalk can be separated without loss in information. The frequency dependent line impedance does not or hardly distorts the analog information when digitized.

The various methods which have been employed for practicing pcm signal transmission, however, generate their own problems. The regenerators require a local clock. That clock must provide pulses at a constant frequency which is synchronized to and by the bit rate of the arriving signal. Each of the conductor pairs in such a cable constitutes an individual transmission path and channel, and require its own clock. Thus, a cable which includes a large plurality of such transmission paths, requires a correspondingly large plurality of clocks for each regenerator station. Therefor, the timing and phasing of the signal regeneration constitutes considerable expenditure for pcm transmission systems, reducing the economy thereof.

Pulses representing the same digital value, e.g. logical "zeros" may appear in immediate sequence, so that the local clock generator may drop out of synchronism. The generator will usually resynchronize shortly thereafter, but possibly at the wrong phase. If analog information is transmitted in sequential frames or characters with plural bits per frame or character, resynchronization requires availability, i.e. separate transmission of frame or character rate, otherwise the phase relation in the pcm series, once disturbed, leads inevitably to a train of consistenly useless data. Synchronization could be maintained with certainty by using a self-clocking format for data encoding. However, the clock has to be extracted from each signal train as received in a regenerating station, and the clock has to be reconstituted separately for each transmission path and channel which involves also considerable circuitry.

It has been suggested to include one particular conductor pair in the cable to be used exclusively for data clock pulse transmission. That clock runs through all of the regenerators in sequence as they are connected to the transmission system. The clock can be extracted from that conductor pair, to be used on all signal channels. In such a system it is no longer necessary to have a private clock for each transmission path and channel. This clock line may receive sinusoidal oscillations or (rectangular) clock bits. The same conductor pair or another one can be used to transmit signals representing the data frame or character rate.

Actually, there is a fixed relation between character rate and data bit clock so that representation of one or the other only is needed, the respective other train can be locally produced in the regenerating station with little expenditure. The transmission of data clock signals requires quite a narrow bandwidth only so that actually regeneration of the clock may not be necessary; in other words, there will be many cases in which the clock can be transmitted through the entire transmission system without regeneration. However, if the transmission system is too long, it may be advisable, for example, to include a clock regenerator in some of the signal regenerating stations; for example, every third station may be so equipped.

The improvement of the invention is signals particularly to the hardware that is involved in the transmission of digital signals, with transmission of a common clock. As stated above, the individual transmission path in a communication cable is defined by a conductor pair, constructed either as a coaxial line or as stranded conductor pair. A cable made of coax lines has the advantage that the transmission line impedance in the several paths is and remains similar so that the signal propagation speed is similar in the several lines included in the cable. Therefor, the signal in these lines all remain in phase with each other and with the clock.

For reasons of economics, it is preferred to use twisted and jacketed conductor pairs, possibly arranged in quads with common shielding etc. Due to inherent lack of uniformity in length of twist, the transition time and propagation speed of the signals in the several lines is no longer uniform. Rather, the several data bits and the clock bits running through a separate channel, may arrive at a regeneration station with different phases.

Now, therefor, in accordance with the principle of the present invention, it is suggested to provide a transmission system for plural parallely operating transmission paths in a common cable and with common clock line in a separate path in the cable, and using twisted conductor pairs for each path and channel, and to provide individual means in each channel that compensates for phase differences in the several channels, so that the common clock line can be used in each regenerator station and maintains synchronism throughout.

Differences in propagation speed can be offset in that the insulation of the individual conductors is provided with a particular compound which influences the propagation speed of the signals, with more ore less of the compound added to obtain similarity in signal propagation time. Carbonyl iron powder as additive to the insulation provides such signal delay, and variations in the relative concentration of that additive provide for variation in the resulting delay. Thus, conductor pairs having relatively large length of twist and correspondingly short relative signal propagation delay, can be provided with such an additional delay for matching their signal phase to the signal phase in conductor pairs with the shortest length of twist.

For reducing costs further, the individual conductor cables are preferably provided in quads. One pair in one of the quads is used for bit clock pulse transmission, the other conductor pair of the quad can be used for separate data frame rate transmission (one data frame holds a selected number of bits or bit frames). For propagation speed compensation of the individual quad one can use an elongated element that runs in the interior of the spiral quad and is enriched with carbonyl iron. Moreover, as bit and frame rates are transmitted in the same quad, their mutual phase will not change along the cable.

Another advantage of the present invention is to be seen in that crosstalk between the individual pairs is compensated through single point compensation, immediately at a regeneration station. This is made possible through equalization of propagation time as suggested. Actually, the transmission becomes more reliable and the number of regenerators, i.e., the distance in between sequential regenerator stations can be increased. That, in turn, renders the system more economical.

The control of the relative phase by means of variation in the relative content of additives to the insulation for the conductors is mentioned here only as one possibility of practicing the invention. In the preferred system, the phase compensation is carried out right at each regeneration station, preferably through variable delay processing and transfer clocking therein. For example, the regenerated and reconstituted data and information bits are asynchronously clocked into a register having as many stages (preferably delay type flip-flops) as there are transmission paths and channels, and they are clocked strictly in parallel into another register whose outputs control the output of the regenerator. Alternatively, the data bits are clocked synchronously into the first register and are asynchronously transferred to the second register so that a signal is set into a transmission path with a delay that is inversely related to relative delay of that path. Both cases can be combined to offset some of the phase differences on the signal arrival side as well as some of the phase differences on the transmission side of a regenerator station. This way up to almost 2 bit clock periods phase differences in between two regenerator stations can be accommodated and compensated. Upon using additional transfer registers, the relative phase difference to be compensated can still be longer.

As stated above, the transmission of pcm signals requires either inclusion of bit rate or bit clock signals, or character or frame rate signals or both in a common or in separate transmission paths. The clock is regenerated in each station, and a high speed sampling or scanning clock is extracted therefrom or synchronized therewith, for selective control of the variable delay clocking as between the several registers and signal shapers.

Figure 2:
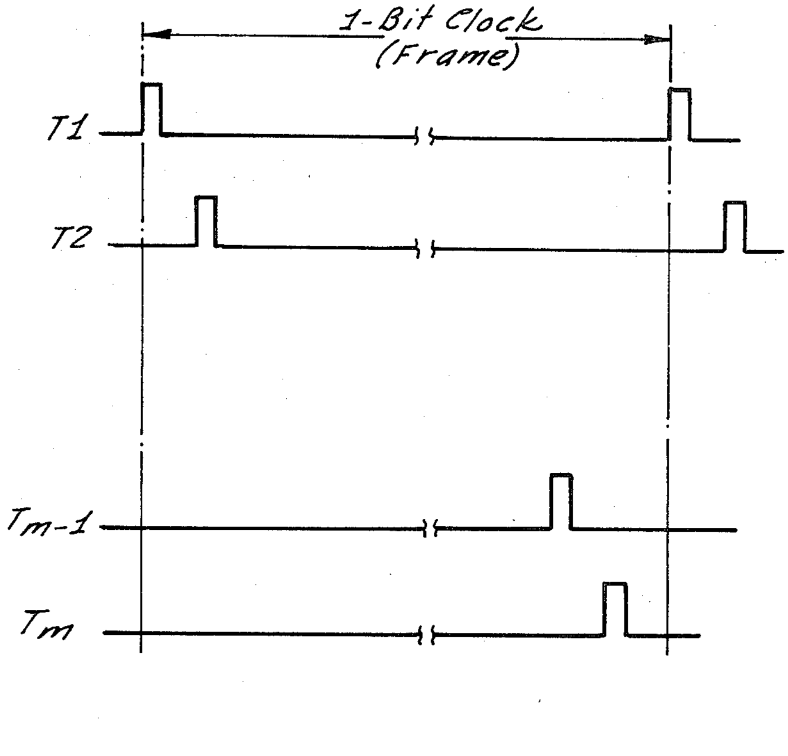

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates somewhat schematically certain details for a regenerator in a multi-channel and multi-signal path transmission system; and FIG. 2 is a time diagram of relevant pulses used in the station of FIG. 1.

Proceeding now to the detailed description of the drawings, in FIG. 1 there are illustrated plural conductor pairs. L1, L2, . . . . , $L_N$, $C_L$, of a communication cable leading into a signal regenerating station. The conductor pairs L1 through $L_N$ are provided to serve as individual transmission paths for digital or digitized information signals. $C_L$ transmit a common data bit clock signal. All conductor pairs may be stranded and are included in a common cable configuration. The cable may be constructed from stranded conductors arranged in pairs or quads which, in turn, are arranged in bundles. The cable may include conductor pairs half of which transmit signals in one direction, the other half in the opposite direction. Only the regeneration of signals travelling in one direction is treated here, regeneration of the other signals is carried out analogously.

Each individual path is defined by a conductor pair, is continued in the regenerator which includes pulse shaping and amplifying circuitry 10 to provide signal regeneration proper. There is one unit per path and channel. In essence, such a unit 10 is an amplifier and a pulse shaper. A unit 10 will include signal level discriminators of the Schmitt trigger variety for shaping the signals as received, thereby reconstituting locally the two bit signal levels used for pcm transmission.

The newly formed, amplified and shaped pulses are then fed to the input of one stage of a register 12, each register stage including a flip-flop of the delay variety. This register is constructed as a parallel by bit register, and has one stage for each transmission path and channel. The circuit is illustrated in that each unit 10 provides actually both logic levels at the same time in complementary fashion, i.e. the unit may have push-pull output circuitry. Assignment of signal level to output line determines the current bit value. Therefor, the set and reset inputs of the respective stage of register 12 can be coupled directly to these two output lines of a unit 10.

Each register stage requires a particular transfer clock pulse for setting the signal as provided by the respective signal regnerating and shaping unit 10 as digital signal into the stage. In essence, the particular transfer clock samples the instantaneous output of signal reconstituting unit 10, and interprets the sample value as transmitted bit value.

These individual sampling or transfer clock pulses for the several stages of register 12 are developed as follow. Regeneration stage 10c receives the common bit clock, sqares the signal or provides a sinusoidal signal and sets the same into a delay line 11. A plurality of delayed clock signals T1 through Tm are developed by means of the delay line 11. There may be a single high frequency oscillator in the station whose squared output is AND-gated with various phases of the bit clock as passing through delay line 11, so as to develop this series of separate pulses T1 through Tm. This signal group recurs at data bit clock rate, each having a delay to the other that is shorter than a data bit clock period of the incoming information signals.

Each of the several stages of register 12 now derives from the multiple, high speed clock, a particular transfer clock pulse sequence. For example, the stage of register 12 receiving the reconstituted data signal from line L1, may use clock pulses T*m*–1. The next stage receiving data signals from line L2 may use T2 etc. Therefor, the reconstituted data signals are sampled from their respective units 10 through time-selective clocking of the several stages of register 12. Some of the stages may use the same clock. This will be particularly so in case of star quads, wherein the two conductor pairs have similar length of twist, and the data through these two paths can be expected to remain in phase synchronism. In case the two pairs of a quad belong to a two-way transmission channel, the two respective two signal paths will be processed in two different regenerator substations; only one is depicted in FIG. 1.

These individual sample and transfer clock pulses T1 through Tm as derivable from delay line 11, represent particular delay periods within one bit frame. The association between clocking of a register stage on one hand, and the channel to which it pertains on the other hand, is such that, for example, the transmission path having the longest delay, uses T1 for data transfer between the respective reconstituting unit and the associated stage of register 12. The transmission path with shortest delay (longest length of twist of the stranded conductor pair) uses, e.g., T*m*–1, for sampling the reconstituted signal level at the output of the respective unit 10. The specific delay in the transmission line has to be considered for selecting the proper sampling clock pulse in each instance.

In the example above it is merely assumed that the clock transmission occurs with the least delay. That is not necessarily so, but can be offset just by suitable selection from the several clocks T1 to T*m*, because the group of sampling clocks recurs with data bit clock rate. In other words, for a given system, the selection of the scanning clock T1 or T2, or . . . . or T*m*–1, for clocking any individual stage of register 12, is any independent operation and it does not make any difference whether any such register clock pulse "belongs" to or was extracted from the previous transmitted data clock or from the next one. Only the relative phase among the several channels and phase synchronism to the clock as a whole is important.

It should now be noted that the maximum permissible propagation delay between any two conductor pairs is not quite 1 bit period. Therefore, the various pulses T1 through T*m*–1 represent a variety of possible and permissible delays within each bit frame (to be distinguished from the longer data frame encompassing a multi bit character). Each sampling and transfer clock pulse, such as T1 or T2 etc., recurs at the bit rate; the transfer clock pulses T1, T2 etc. as a whole recur at higher rate.

The several bits are set into register 12 at different instants, but at the end of a bit frame period, 1 bit each of all channels has been set into register 12. Now the assembled bits are clocked in unison into another register 13, which can be regarded as an output register for the regeneration station. The output stages of register 13 control plural conductor pairs L'1, L'2, . . . . , $L'_N$. These conductors lead from the illustrated regenerator station to the next one (or to the destination for the signals). In other words, register 13 is or is part of the transmitter for the regenerator station. The distance to the next regenerator station should be selected so that any relative phase shift in between signals in any two conductor pairs does not exceed one bit frame. A deviation from this rule will be discussed shortly.

The data clock itself is included in that pattern of transmission. The data clock leaves via path C'L. The data clock can be used in the next regenerating station in the same manner as outlined above. As the system provides for strict phase synchronism and coherency in the transmission of the clock a separate channel for character or frame rate transmission is not needed. Such transmission may, however, be desirable for maintaining synchronism between transmitters and receivers, as disturbances other than caused by the transmission must be expected. Such frame clock will be treated just as another transmission path, but if data and frame clocks run through a quad, the same sample clock will probably be used in the station.

It can be seen that the system as illustrated and explained compensates for different delays among the various data bits after their arrival at the station, so that the reconstituted data signals leave the station in strict synchronism and at the same time, for propagation to the next regenerator station. In the alternative, the situation can be reversed. Rather than equalizing the transmission time in the several transmission lines after arrival, the data signals can be transmitted asynchronously, but for in-phase arrival at the next station. The FIG. 1 is also suitable for explaining the case.

For example, the various data bit signals are assumed to arrive concurrently in the station for reconstutition in the several pulse chapers 10. The shaped bits are clocked concurrently into register 12 by a scanning or sampling pulse such as T1. Now, the transfer of all data bits from register 12 to register 13 is individualized through usage of a selected transfer clock, T2 or T3 etc. or T*m*. The stage of register 13 controlling the line with the largest phase delay receives the respective bit the earliest in that, e.g. T2, is used for the bit transfer from the respective stage in register 12 to that in register 13. That instant marks the beginning of transmission of the bit to last to the next pulse T2, which, of course, recurs at data bit clock rate.

The output line L' with the shortest transmission delay receives the data bit as the particular stage of register 13 is clocked with T*m*. As a consequence, the data bits will arrive at the next station in unison and concurrently.

It is, of course, possible to combine the two types of transmission delay compensation. First, selected scanning clock pulses T1 through Tm are used to assemble the bits in register 12 as they arrive at the regenerating station at different times. Then the data bits are all transmitted in parallel to another register, and the transfer from that register to register 13 is again subjected to timed control and clocking by suitable selection from T1 through Tm. In this case, a one bit period delay is introduced in the system, but consistently so and the overall result is not altered thereby.

It can readily be seen that this latter method allows compensation of relative transit delays up to two data clock periods. Longer relative delays (up to three data clock periods) can be compensated by selectively timing the transfer from register 12 to the additional register. Still longer delays can actually be compensated by including still more registers and gradually eliminating the phase differences with each transfer. This is basically made possible by extracting the transfer and sampling clock pulses from the data bit clock in particular, definite phase relation thereto. Thus, for a given system, the number of regenerating stations is about half of the number or less than needed in each of the two other cases, provided, of course, that the crosstalk is not excessive to the extent of obliterating signal levels beyond the point of reconstitutability. The entire arrangement can be interpreted in still another manner. The clock line CL–CL′ may represent time slots for multiplexing or time division and transmission of different data trains in each conductor pair and transmission channel.

The invention is not limited to the embodiments described above but all changes and modifications thereof not constituting departures from the spirit and scope of the invention are intended to be included.

We claim:

1. In a communication system for the transmission of digital signals and including plural stranded conductor pairs, each pair defining a single transmission path, the system further including signal regenerating stations, for regenerating the individual signals for improving the signal to noise ratio of the transmission system as a whole, the digital signals as transmitted including bit clocking signals, the improvement comprising:

means included in the system for equalizing propagation phase differences in the signals of the transmission paths of the plurality as resulting from differences in length of twists of the several conductor pairs of the plurality.

2. In a system as in claim 1, wherein the means for equalizing are including in the station and include bit signal transfer means and transfer clock means, providing clock pulses at a rate above the bit clock rate, for controlling the bit signal transfer means individually for each transmission path, to offset the propagation phase differences.

3. In a system as in claim 2, the regenerating station including a first register, the clocking means connected for individual input clocking the bits into the first registers at a relative phase offsetting said relative propagation phase differences; and a second register receiving the content of the first register in parallel.

4. In a system as in claim 2, the regenerating station including a first register connected for receiving the signals from the several conductor pairs in parallel, a second register connected for receiving the bits held in the first register, the transfer clocking means providing for individual clocking of the transfer of bits from the first to the second register at a relative phase determined in accordance with said propagation phase differences, for the second register to receive the bits under phase differences compensating said propagation phase differences.

5. In a system as in claim 1, wherein each conductor is insulated, the insulation of at least some conductors including carbonyl-iron powder, the relative content determined to obtain a particular delay of signals passing through the respective conductor, the delays determined for obtaining said phase equalization.

* * * * *